United States Patent [19]

O'Connor et al.

[11] Patent Number: 5,010,559
[45] Date of Patent: Apr. 23, 1991

[54] SYSTEM FOR SYNCHRONIZING DATA FRAMES IN A SERIAL BIT STREAM

[75] Inventors: James T. O'Connor, Dallas; David A. Courtright, Carrollton, both of Tex.

[73] Assignee: SGS-Thomson Microelectronics, Inc., Carrollton, Tex.

[21] Appl. No.: 374,277

[22] Filed: Jun. 30, 1989

[51] Int. Cl.$^5$ .............................................. H04J 3/06
[52] U.S. Cl. .................................... 375/116; 375/114; 370/105
[58] Field of Search ......................... 375/114, 116; 370/105.4, 106, 105; 364/715.11

[56] References Cited

U.S. PATENT DOCUMENTS

| | | | |
|---|---|---|---|
| 3,482,044 | 12/1969 | Kaneko | 375/116 |
| 4,347,606 | 8/1982 | Hoogeveen | 375/116 |
| 4,730,346 | 3/1988 | Jiang | 370/105 |
| 4,744,081 | 5/1988 | Buckland | 375/114 |
| 4,768,192 | 8/1988 | Pattavina et al. | 370/105.4 |
| 4,930,125 | 5/1990 | Bains | 370/105 |

Primary Examiner—Benedict V. Safourek
Assistant Examiner—Una Kim
Attorney, Agent, or Firm—Richard K. Robinson; Kenneth C. Hill

[57] ABSTRACT

A synchronizer in a receiver for a serial data stream includes a shift register for temporarily storing the most recently received data. Taps at a plurality of locations on such shift register provide bit signals at regularly spaced locations. These bit signals are checked for the occurrence of predetermined patterns which indicate the occurrence of frame bit candidates. A candidate shift register indicates which bit positions currently remain as candidates for the frame bit position, and is shifted synchronously with the incoming data. The candidate shift register is N bits in length, and a modulo-N counter is connected to the serial output thereof. Each time a bit position shifted out of the candidate register contains a valid candidate, the modulo-N counter is reset. When the counter counts for a full cycle, the true frame bit position has been identified.

14 Claims, 2 Drawing Sheets

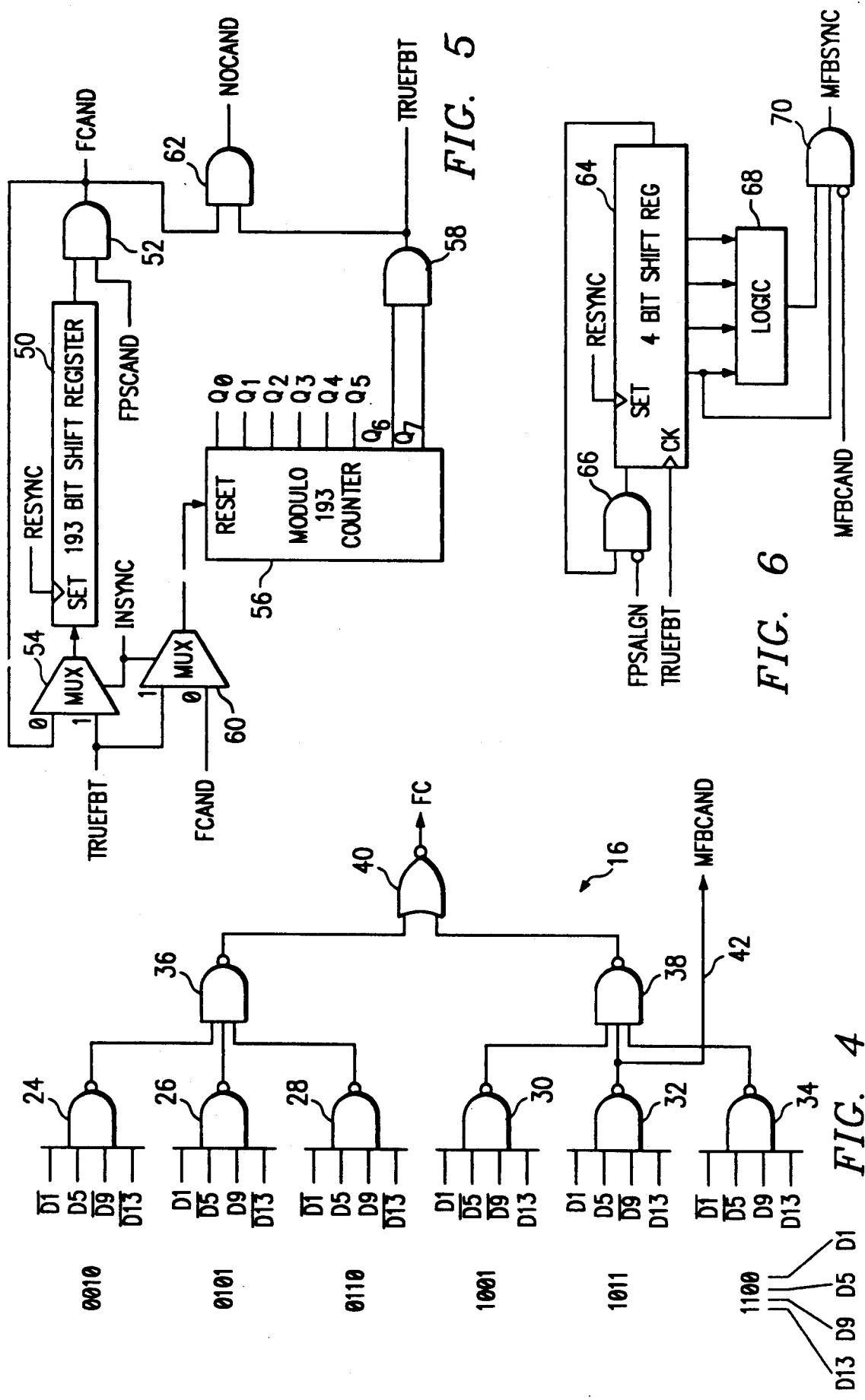

SYSTEM FOR SYNCHRONIZING DATA FRAMES IN A SERIAL BIT STREAM

CROSS-REFERENCE TO RELATED APPLICATIONS

The present application contains subject matter in common with pending U.S. application Ser. No. 07/374278 titled SYSTEM FOR SYNCHRONIZING DATA FRAME GROUPS IN A SERIAL BIT STREAM, filed on even date herewith and assigned to the assignee of the present invention.

BACKGROUND OF THE INVENTION

1. Field of the Invention

The present invention relates generally to electronic circuits, and more specifically to a system and method for obtaining frame synchronization by a receiver within a serial bit stream.

2. Description of the Prior Art

High speed serial data links are usually used when it is desired to transmit data over long distances. Typically, parallel data is serialized, transmitted as a serial bit stream, and reassembled into the original parallel information at the receiving end. The transmitted data can represent actual digital information, or may represent analog information which has been sampled and digitized.

When transmitting serial data, it is important that the sender and receiver be kept in synchronization. This can be done in many ways, one of which is the inclusion of synchronization information in the data stream. Such synchronization information is placed into the data stream by the transmitting device, and removed therefrom by the receiving device. The synchronization information comprises one or more special codes which are looked for by the receiving device. The synchronization codes can be located together, such as in a frame header, or may be distributed as individual bits within the data.

An example of the latter approach is found in the T1 standard promulgated by AT&T, and used for multiplexed telephone transmissions. In the T1 standard, 24 8-bit data channels are grouped together into a serial data packet called a frame. Each frame also contains one framing bit, which is the first bit of the frame. This gives a total of 193 bits for each frame. Frames are transmitted at a rate of 8192 frames per second, which is the standard data transmission rate for CODECs used to digitize and restore voice and other analog signals.

A single data frame is shown in FIG. 1. The first bit to be transmitted, bit 0, is the frame bit. The remaining 192 bits of the frame contain 24 channels of 8-bit data as shown. The frame bit F is inserted into the data stream by the transmitting device, and removed by the receiving device after it is used for synchronization purposes.

According to the T1 standard, frames are grouped into sets called multiframes, or super frames. The 193s standard uses 12 frames in a multiframe, and the 193e standard uses 24 frames in a multiframe. An example of a 193e multiframe is shown in FIG. 2. 24 consecutively transmitted frames are defined to be a multiframe. The frame bits from each of the 24 frames are used in combination to identify which frame is frame 1 of the multiframe, and for other purposes.

At the receiving device, synchronization of the incoming serial data stream is performed by examining the stream, and identifying which bits are the frame bits. There is no additional information to identify these bits; they must be extracted out of the data by looking for preselected patterns used by the framing bits. The pattern of frame bits within a multiframe is used to identify the frame bits, thereby defining data frames, and for determining the boundaries of each multiframe.

As an example, using the 193e standard, the frame bits for frame numbers 4, 8, 12, 16, 20, and 24 are assigned the pattern 001011. The frame bits for the odd numbered frames form a low bandwidth data channel which can be used for control and signaling purposes. The frame bits for frames 2, 6, 10, 14, 18, and 22, taken together, define a CRC word for the previously transmitted multiframe.

Because the data transmitted on the serial channel is essentially random for synchronization purposes, the receiver cannot immediately extract the position of the framing bits and multiframes from the data stream. The receiver must examine the incoming data stream for some period of time in order to determine frame alignment, which is defined by the location of the frame bits. Once the frame bits are properly located, the multiframe alignment is determined by looking for the position of the 001011 pattern described above.

Examples of prior art circuits for establishing frame and multiframe alignment are found in U.S. Pat. No. 4,727,558, issued to Hall, and U.S. Pat. No. 4,316,284, issued to Howson. The systems described in these patents both use the same technique for establishing frame and multiframe alignment. A large shift register is used to store a portion of the received serial data stream. The shift register is tapped at 4 points which are 772 bits apart (4 frames apart), and the systems look for the 4-bit subsequences which are obtainable from the repeating 001011 pattern. A 772 bit shift register is used to hold candidate positions for frame bit positions. This shift register is shifted synchronously with data entering the large shift register. As invalid multiframe patterns are observed at the tap locations, the corresponding position out of 772 is marked in the 772 bit shift register as no longer being a valid candidate position.

A counter is connected to the 772 bit shift register for counting how many candidate positions remain. Each time the 772 bit shift register is shifted through one complete cycle, the counter determines whether 0, 1, or more than 1 candidate positions currently remain. Eventually, the 772 bit shift register contains exactly 1 remaining candidate position, which is taken to be the true location of the framing bits for frames 4, 8, 12, 16, 20, and 24. Multiframe alignment by matching the values of the bits corresponding to the position identified in the 772 shift register with the 001011 pattern is then straightforward.

It would be desirable to provide a synchronization circuit for a serial data receiver which has improved response, and which is simply and easily designed into a portion of an integrated circuit.

SUMMARY OF THE INVENTION

It is therefore an object of the present invention to provide a synchronization system for a receiver for a serial data stream.

It is another object of the present invention to provide circuitry for determining frame bit positions in a serial data stream.

It is a further object of the present invention to provide an improved counting means for determining when only a single candidate frame bit position remains from among a plurality of starting candidate positions.

Therefore, in order to accomplish these and other objects of the present invention, a synchronizer in a receiver for a serial data stream includes a shift register for temporarily storing the most recently received data. Taps at a plurality of locations on such shift register provide bit signals at regularly spaced locations. These bit signals are checked for the occurrence of predetermined patterns which indicate the occurrence of frame bit candidates. A candidate shift register indicates which bit positions currently remain as candidates for the frame bit position, and is shifted synchronously with the incoming data. The candidate shift register is N bits in length, and a modulo-N counter is connected to the serial output thereof. Each time a bit position shifted out of the candidate register contains a valid candidate, the modulo-N counter is reset. When the counter counts for a full cycle, the true frame bit position has been identified.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

FIG. 4 is a logic diagram of a portion of the circuitry of FIG. 3;

FIG. 5 is a block diagram of a shift register and counter for selecting the true frame bit position; and FIG. 6 is a block diagram of a shift register and associated logic for determining multiframe positioning.

DESCRIPTION OF THE PREFERRED EMBODIMENT

The logic circuitry described herein utilizes positive logic. AND gates are frequently used for combinational logic to illustrate the combination of signals which are used. However, in actual practice, integrated circuit designs usually incorporate NAND and NOR gates due to various design considerations. Logic circuits equivalent to those shown may use these and other logic gates to form equivalent circuits. In many parts of the system, true and complemented values for most signals are available, and generation of such values is not explicitly shown. The circuits described herein have been simplified for ease of illustrating and describing the principles involved in the present invention, and practitioners skilled in the art will be able to provide details of missing or generalized portions according to standard logic design principles.

Figure 1:
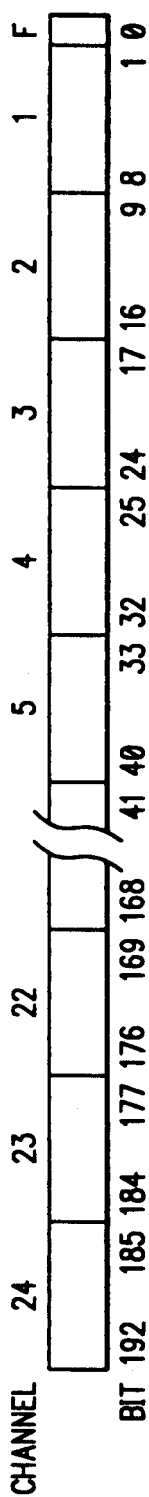
FIG. 1 illustrates a single data frame in a serial data stream.
Figure 2:
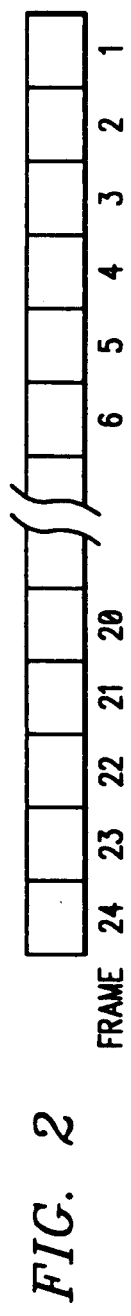
FIG. 2 illustrates a multiframe of 24 data frames.
Figure 3:
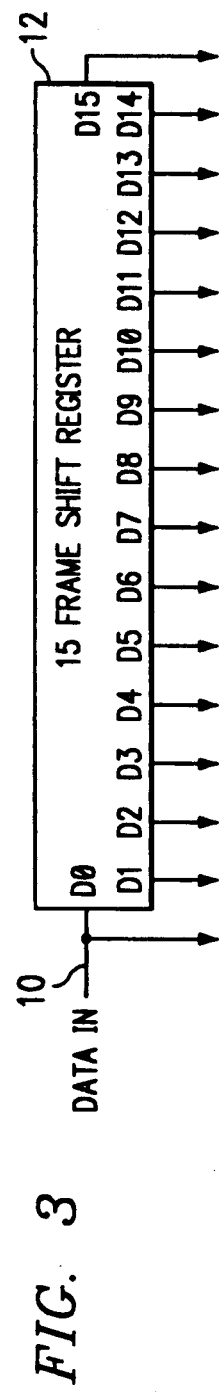
FIG. 3 is a block diagram of a shift register and associated circuitry for determining valid candidate frame bit positions.
Figure 3:
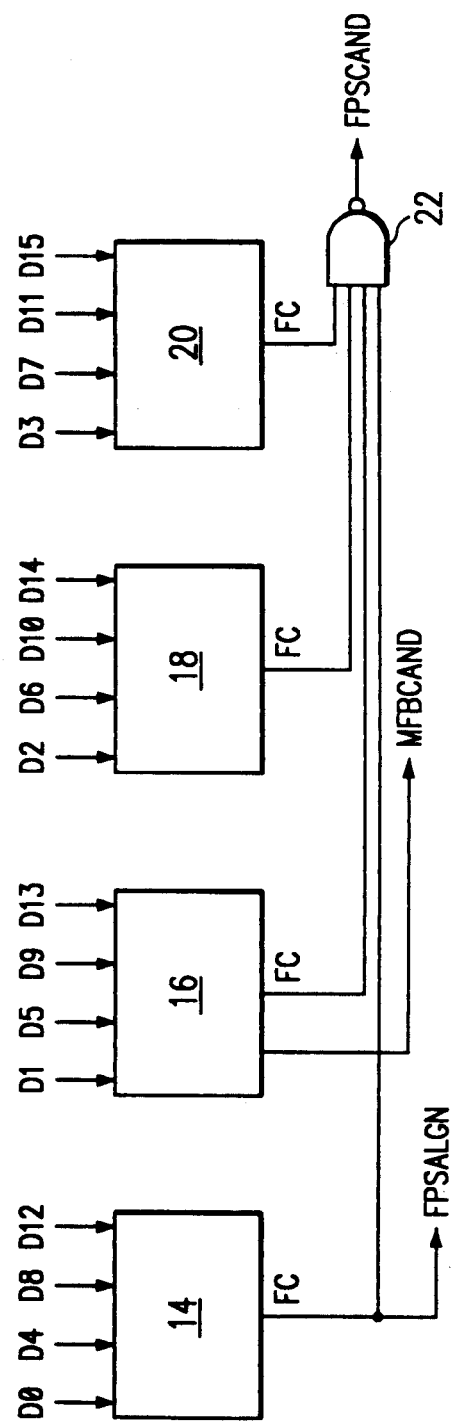

Referring to FIG. 3, serial data is input to the synchronizer on signal line 10, and shifted into a 15 frame shift register 12 at the rate of 1 bit per clock cycle. Shift register 12 holds up to 15 193-bit frames of data. 15 output taps D1-D15 are provided from the shift register 12. These taps are spaced 193 bits apart, beginning at the 193rd position from the input. These 15 taps, combined with the next data bit ready to be shifted into the register 12, identified as D0, provide 16 spaced data bits representing the most recent history of received data. D0 is the currently received bit, and D15 is the data bit received furthest in the past. Since all of the taps are spaced 193 bits apart, if D0 is actually a frame bit signalling the start of a new frame, each of the other tap data bits D1-D15 are also frame bits.

Four combinational logic blocks 14, 16, 18, 20 have inputs connected to the data tap outputs of the shift register 12. The circuitry of blocks 14, 16, 18, 20 is shown in more detail in FIG. 4. With the exception of block 16, which generates an extra signal MFBCAND, each of the blocks 14, 16, 18, 20 are identical.

Combinational logic block 14 uses data taps D0, D4, D8, and D12 as inputs. This means that the bits input into logic block 14 are exactly 4 frames apart. As described above, this spacing of 772 bits is precisely that which is needed to search for the binary 001011 pattern which defines frame and multiframe synchronization.

Combinational logic block 14 generates an output, FC, which is connected to one input of NAND gate 22. The FC output of logic block 14 is also defined to be the signal FPSALGN. The signal FC indicates whether or not the 4 bits D12, D8, D4, and D0 define a 4-bit subsequence of the recurring 001011 pattern. FC is low when any one of these subsequences is detected. The signal FPSALGN indicates a frame pattern sequence alignment at this particular location, and is used in multiframe alignment.

The remaining combinational logic blocks 16, 18, 20 also generate a framing candidate signal FC which is connected to the NAND gate 22. The signal FPSCAND, when high, indicates that the current bit position is a framing pattern sequence candidate because at least one of the combinational logic blocks 14, 16, 18, 20 found a 4-bit subsequence from the repeating pattern 001011.

The following 6 4-bit subsequences are recognized by the combinational logic blocks 14, 16, 18, 20: 0010, 0101, 1011, 0110, 1100, and 1001. These subsequences are determined by taking the first 4 bits of the 6-bit sequence, then rotating the first bit to the end of the sequence. This process is repeated 6 times to generate the 6 subsequences just listed.

FIG. 4 shows the combinational logic used to implement logic block 16 to recognize the 6 valid subsequences just listed. With the exception of the output signal MFBCAND, the identical logic is used in all 4 blocks 14, 16, 18, 20.

Referring to FIG. 4, logic block 16 contains 6 4-input NAND gates 24, 26, 28, 30, 32, and 34. Each of these gates has one input connected to either the true or complement signals for D1, D5, D9, and D13. The outputs from gates 24, 26, 28, are connected to the inputs of NAND gate 36. The outputs of gates 30, 32, 34 are connected to the inputs of NAND gate 38. The outputs of NAND gates 36, 38 are connected to the inputs of NOR gate 40. If one of the NAND gates 24-34 recognizes a valid 4-bit subsequence, the output signal FC becomes a logical 0. Otherwise, FC has a value of 1.

Within the valid 4-bit subsequences, data bit D1 is the last bit of the subsequence because it was the last bit to arrive. Bit D13 is the first bit of the subsequence because it was the first bit to arrive as between D13, D9, D5, and D1.

As described earlier, the frames within a multiframe containing the 6-bit sequence 001011 are frame numbers 4, 8, 12, 16, 20, and 24. Therefore, when the frame bit of frame one of a new multiframe is currently present on data line D0, data taps D13, D9, D5 and D1 contain the bit pattern 1011, which are the last 4 bits of the framing pattern sequence. Therefore, when this subsequence is seen by combinational logic 16, it is known that bit D0 may be the first bit of a new multiframe.

The subsequence 1011 is recognized by NAND gate 32, so a signal line 42 is connected to the output thereof and carries signal MFBCAND. This signal indicates that a multiframe bit candidate exists, meaning that the bit currently at D0 may the first bit of a new multiframe. This information is used in multiframe alignment as will be described further in connection with FIG. 6. The signal line 42 is not found in the other combinational logic blocks 14, 18, 20, and is the only difference between combinational logic block 16 and these other blocks.

Referring to FIG. 5, circuitry is shown for determining the true frame bit position within a frame of 193 bits. A 193 bit shift register 50 has an output connected to AND gate 52. The shift register 50 is clocked each time a new data bit is shifted into the synchronizer on signal line 10. The other input to AND gate 52 is connected to the signal FPSCAND generated in FIG. 3. The output of gate 52 defines the signal FCAND, indicating that the current output bit of the shift register 50 is a framing candidate bit. The signal FCAND is fed back into the input of the shift register 50 through multiplexer 54.

Multiplexer 54 has a control input controlled by the logical signal INSYNC, which has a value of 1 when synchronization has been established, and a value of 0 otherwise.

A modulo 193 counter 56 is also clocked each time a data bit is shifted in to the synchronizer. The 7th and 8th output bits $Q_6$ and $Q_7$ from the counter 56 are connected to an AND gate 58 which generates a true frame bit position signal TRUEFBT. A reset input to the counter 56 is connected to the output of a multiplexer 60. The multiplexer 60 has a control input connected to the synchronization indicating signal INSYNC.

When INSYNC is low, indicating that multiframe alignment synchronization has not yet been made, the signal FCAND is connected to the reset input of the counter 56 through multiplexer 60 and to the shift-in input of the shift register 50. When INSYNC is high, the signal TRUEFBT is connected to both the reset input of the counter 56 and the input of shift register 50 through the multiplexers 60 and 54 respectively.

The signals TRUEFBT and FCAND are connected to AND gate 62, which generates the signal NOCAND. This signal is used to indicate possible framing errors which occur after synchronization has been established.

To begin synchronization, the shift register 50 is set to contain all 1s. This is done with the signal RESYNC connected to a set input of the shift register 50, which indicates the synchronization process is to begin. Counter 56 is reset to 0, and the signal INSYNC is 0. FPSCAND indicates whether or not any of the combinational logic blocks 14, 16, 18, 20 recognizes one of the described 4-bit subsequences. If so, this bit position, out of 193 possible bit positions, is a candidate to be the frame bit position. Thus, FCAND has a value of 1, and this value is recirculated into the input of the shift register 50 through the multiplexer 54. The counter 56 is also reset to 0.

When none of the combinational logic blocks 14, 16, 18, 20 recognizes a valid 4-bit subsequence, which will happen approximately 10/16 of the time for random data positions, FPSCAND will be 0, causing FCAND to also be 0. When this occurs, a 0 is circulated to the input of the shift register 50, meaning that particular bit position cannot possibly be the actual frame bit position. A 0 in shift register 50 means that a candidate position has been eliminated as a candidate for the true frame bit position. When a candidate is thus eliminated, the counter 56 is not reset, and increments in the usual manner.

Once a candidate position has been eliminated, represented by a 0 in shift register 50, FCAND will thereafter always be 0 for that position regardless of the value of FPSCAND. The remaining 1s in shift register 50 will eventually be eliminated, leaving a single 1 and 192 0s circulating through the shift register 50. The single remaining 1 corresponds to the true position of the frame bit within an arbitrary sequence of 193 bits. When the single 1 within the shift register 50 is shifted to the output thereof, the incoming data is properly positioned within the 15 frame shift register 12 so that the tap data bits D0–D15 are the true frame bits.

As described above, whenever FCAND is a 1, the counter 56 is reset to 0. Counter 56, which has a modulus exactly equal to the number of bits in shift register 50, will be allowed to count to its highest value (192) only when a single 1 remains in shift register 50. Outputs $Q_6$ and $Q_7$ from counter 56 both have a value of 1 only when the value of the count is 192. At that time, for 1 clock period, TRUEFBT goes high, indicating that the true frame bit location has been found, and is currently located at the data taps D0–D15. If, due to a data transmission error, no 1s remain in shift register 50, NOCAND will remain low when TRUEFBT goes high. In this circumstance, the synchronization process must be started over by reloading 1s into shift register 50 and resetting counter 56 to 0.

The signal INSYNC will go high only after frame alignment and multiframe alignment have been made. After this occurs, the signal TRUEFBT is used to reset counter 56 and provide the input to shift register 50. If a single bit error occurs in a framing bit during transmission, this allows a 1 to be retained in shift register 50 even though the signal FPSCAND may be 0. The signal NOCAND will indicate a framing error, and additional control logic (not shown) can take note of such fact. If several such errors occur, the control logic will assume that synchronization has been lost and can reinitiate the synchronization process. However, in the case of a single bit error in a framing bit, synchronization will be retained and it will not be necessary to undergo the synchronization process again.

Referring to FIG. 6, circuitry is shown for performing multiframe alignment once the true frame bit position has been found. A 4-bit shift register 64 has an output connected to an input of AND gate 66. The signal FPSALGN is connected to an inverting input of AND gate 66. This signal is inverted because, as described in connection with FIGS. 3 and 4, FPSALGN is an active low signal. It has a value of 0 when a valid 4-bit framing candidate subsequence occurs in data tap positions D0, D4, D8, and D12.

The clock input to shift register 64 is driven by the signal TRUEFBT. The 4 bit outputs from shift register 64 are connected to combinational logic block 68. The output from the first bit position, as well as the output from logic block 68 and the signal MFBCAND, are provided as inputs to AND gate 70. The signal MFBCAND, shown in FIGS. 3 and 4, is also an active low signal and therefore applied to an inverting input to AND gate 70. AND gate 70 generates an output signal MFBSYNC, which indicates that multiframe bit alignment has been synchronized.

Shift register 64 operates in a manner similar to shift register 50 shown in FIG. 5. When synchronization is initiated, all 4 bits are set to 1. As before, this is done with the RESYNC signal, which is connected to a set input of shift register 64. The signal TRUEFBT used to clock shift register 64 does not begin to generate pulses until frame bit alignment has been synchronized. At such time, shift register 64 is clocked once for each frame of serial data which is received. The clock pulse occurs when a frame bit is available at data tap D0, as well as D1–D15. If FPSALGN indicates that a valid 4-bit subsequence is present on taps D0, D4, D8, and D12, and a 1 is currently being shifted out of the shift register 64, AND gate 66 will generate a 1 to be shifted back into the register 64.

Combinational logic block 68 is a simple logic circuit which generates a logical 1 output when exactly 1 of the 4 bits within the shift register 64 is a 1. Thus, the signal MFBSYNC will be high for 1 clock cycle when there is exactly one 1 in shift register 64, when that 1 is in the first bit position, and when MFBCAND indicates that the last 4 bits of the 6-bit 001011 sequence currently appear on data tap outputs D1, D5, D9, and D13. ANDing MFBSYNC with TRUEFBT will generate a 1 cycle pulse once for every multiframe. This pulse will occur exactly when the frame bit of the first frame of a multiframe currently appears at data tap D0.

The circuitry described above has been directed to a specific implementation for synchronizing a serial data stream formatted using the T1, 193e standard. It will be apparent to those skilled in the art that straightforward modifications will be sufficient to allow the circuitry to synchronize to 193s data also. Since, using the 193s standard, all frame bits are used only for synchronization, the multiframe synchronization circuitry of FIG. 6 is not necessary. It is necessary only to connect a combinational logic block to data tap outputs D0–D11, and generate a signal FPSCAND whenever a valid 12-bit sequence occurs across all 12 framing bits in a 193s multiframe. The circuitry of FIG. 5 remains unchanged. Since all 12 frames of a 193s multiframe are present in the 15 frame shift register 12 at the same time, a simple combinational logic circuit is all that is necessary to determine multiframe alignment once TRUEFBT is generated.

Although the techniques described herein are referenced to synchronization for standard T1 formats, they can be modified to accommodate variations through straightforward application of logic design. For example, frame lengths and multiframe lengths can be changed by simply changing the sizes of the various shift registers and counters. Framing pattern sequences other than 001011 are easily accommodated by a simple change in combinational logic circuitry. The precise design of logic gates used to implement the techniques described herein can be changed to accommodate other logic functions designed on the same chip in accordance with well known design principles. For example, CRC circuitry will typically be included, as will delay counter circuitry for delaying the various synchronization obtain signals until some selected minimum number of frames or multiframes have been validated.

Further variations can be made utilizing the teachings described herein. For example, the counter could be used with the Howson or Hall references described in the Background. A modulo 772 counter would be used instead of a modulo 193 counter in order to match the 772 bit candidate shift register. Also, in some designs, a random access memory plus addressing circuitry can be substituted for the shift registers to perform the same functions.

While the invention has been particularly shown and described with reference to a preferred embodiment, it will be understood by those skilled in the art that various changes in form and detail may be made therein without departing from the spirit and scope of the invention.

What is claimed is:

1. A system for determining frame alignment within a serial data stream, each frame having a frame bit, comprising:
   a shift register having N bit locations, said register initially having all N bits set to a first logic state;
   first logic means for generating a candidate signal when selected bits from the data stream match a preselected pattern;
   second logic means for shifting the first logic state into said shift register if a current shift register output is in the first logic state and said first logic means is generating a candidate signal, and for shifting a second logic state into said shift register otherwise; and
   a modulo N counter, wherein said counter is incremented each time said second logic means shifts the second logic state into said shift register, and wherein said counter generates a signal identifying a frame bit position when it counts to (N−1), and wherein said counter is reset when the first logic state is shifted into said register by said second logic means.

2. The system of claim 1, wherein each frame has a length of N bits.

3. The system of claim 2, wherein the selected bits from the data stream are spaced N bits apart.

4. The system of claim 1, wherein selected bits are K*N bits apart in the data stream, wherein K is a positive integer.

5. The system of claim 4, wherein K is 4 and N is 193.

6. The system of claim 4, wherein K sets of selected bits are compared with the preselected pattern in parallel, and wherein the candidate signal is generated if any of the K sets match the preselected pattern.

7. A method for synchronizing a received serial data stream having frame bits spaced N bits apart, comprising the steps of:
   setting all bits of an N bit shift register to a first logic state;
   for each received data bit, generating a candidate signal if a plurality of spaced received bits matches a preselected pattern;
   for each received data bit, shifting the shift register and incrementing a modulo N counter;
   if a bit shifted out of the shift register is in the first logic state and a candidate signal is generated, then shifting a bit having the first logic state into the shift register and resetting the counter, otherwise shifting a bit having a second logic state into the shift register; and
   generating a frame synchronization signal when the counter counts to (N−1).

8. The method of claim 7, wherein P=N.

9. The method of claim 7, wherein the plurality of spaced received bits matched with the preselected pattern are spaced K*N bits apart, wherein K is a positive integer.

10. The method of claim 9, wherein K is 4 and N is 193.

11. A system for determining frame alignment in a received serial bit stream, comprising:
a first shift register for receiving the serial bit stream, said first register having a plurality of data outputs spaced N bits apart;
combinational logic circuitry connected to the data outputs for generating a candidate signal when a set of data outputs spaced K*N bits apart matches a preselected pattern;
a second shift register having N bits, said second shift register initially having all N bits set to a first logic state, wherein said second shift register is shifted once as each bit in the bit stream is received;
selector logic circuitry for shifting the first logic state into the second shift register if a current second shift register output is in the first logic state and said combinational logic circuitry is generating a candidate signal, and for shifting a second logic state into said second shift register otherwise; and
a modulo N counter, wherein said counter is incremented each time said selector logic circuitry shifts the second logic state into said second shift register, and wherein said counter generates a frame alignment signal when it counts to (N−1), and wherein said counter is reset when the first logic state is shifted into said second shift register by said selector logic circuitry.

12. The system of claim 11, wherein N=193.

13. The system of claim 12, wherein K=4.

14. The system of claim 11, wherein K sets of selected bits are compared with the preselected pattern in parallel, and wherein the candidate signal is generated if any one of the K sets match the preselected pattern.

* * * * *